March 22, 1927.                                                              1,622,136
                          C. W. DWORACK
              SELF FEEDING ROTATING LUBRICATING SYSTEM
                          Filed June 6, 1924
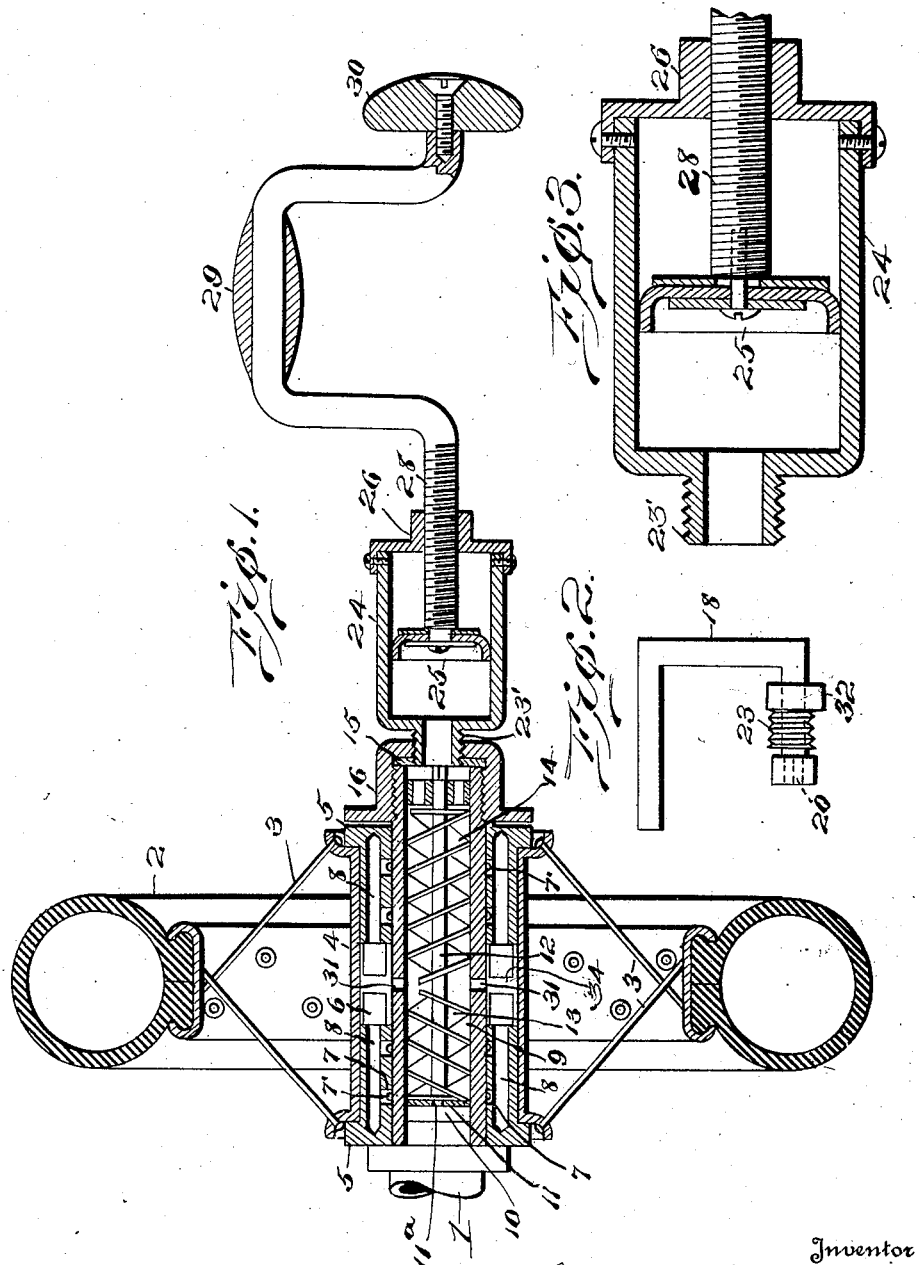
Inventor
Charles W. Dworack
By Robert H. Young
   Attorney Patented Mar. 22, 1927.

1,622,136

UNITED STATES PATENT OFFICE.

CHARLES W. DWORACK, OF DAYTON, OHIO.

SELF-FEEDING ROTATING LUBRICATING SYSTEM.

Application filed June 6, 1924. Serial No. 718,273.

This invention relates in general to lubricating systems and more particularly to a lubricating system designed for lubricating the axles of aircraft and the like.

It is the present practice to lubricate the axle of aircraft preparatory to flight by jacking up the axles, removing the wheels and applying hard grease directly to the axles. When the wheels are again slid on to the axle a large part of the grease thus applied is forced off the bearing surface and only a thin film remains. If the airplane is a heavy one or one so designed that a long run on the ground is necessary before sufficient speed can be gained to take off, the film of grease is almost entirely destroyed and the friction of the wheel on its axle seriously impedes the speed of the plane. Moreover, when the axles of airplanes are lubricated in this manner it is exceedingly impractical to attempt to tow a plane for any appreciable distance as it is essential to stop to lubricate the axles at too frequent intervals.

It is the object of my invention to provide a lubricating device for axles of this type, such that an ample supply of lubricant will be fed to the axles continuously as the wheels rotate.

It is a further object of my invention to provide a grease container within my axle capable of being easily filled without the removal of the wheels of the craft.

Other objects of my invention will appear in the following specification and claims and will be disclosed in the accompanying drawings in which—

Figure 1 is a diametrical section of an airplane wheel embodying my invention.

Figure 2 is a detail view in elevation of a portion of my device.

Figure 3 is a central sectional view showing the means for filling my lubricant container.

Referring with greater particularity to the drawings it will be seen that my device is comprised as follows:

Mounted on the usual hollow axle 1 is a wheel 2 having the usual spokes 3 and the bearing housing 4. Within the interior of the bearing housing 4 there are mounted two opposed bronze bearing members 5 pressed into the housing 4 from opposite ends thereof. The bearings 5 are each slightly less than half the length of the housing 4 and are thus adapted to leave a small space 34 between their inner ends. The bearings 5 are provided with a plurality of longitudinally extending bores 8 which communicate with a plurality of axially disposed apertures 7. The bearings are further provided with spirally cut grooves 7′ adapted to provide for equal distribution of the lubricant from the surface of the axle and its bearing. Fixedly mounted in the inner ends of the bearings 5 are a plurality of steel fins 6 which are disposed at an angle to the longitudinal axis of the bearing. The interior of the axle between the wheels of the aircraft is adapted to be closed by a filler 10 of suitable light material against which bears a bearing 11 which is provided with a recess 11ª adapted to receive the rounded end of a conveyor shaft 12. The conveyor shaft 12 has mounted thereon a pair of conveyors 13 and 14, the conveyor 13 being a left hand conveyor and the conveyor 14 being a right hand conveyor. These conveyors substantially fill the bore 9 of the axle and when rotated tend to convey the lubricant within the interior of the axle away from the ends of the shaft bearing and towards the center thereof and are thus adapted to feed the lubricant through the aperture 31 into the space 34. The outer end of the conveyor shaft is provided with a suitable washer 15 to prevent the escape of lubricant from the interior of the bearing. The usual nut 16 is provided for holding the wheel in its position on the axle.

In line with the center of the axle the nut 16 is provided with a screw threaded recess adapted to receive the screw threaded plug 32. The plug 32 has a smooth bore through which extends one end of an unequal armed U-shaped member 18, the inner end of the U-shaped member 18 being provided with a square cut recess 20 adapted to receive the square cut end of the conveyor shaft 12. The other arm of the U-shaped member is adapted to extend to a point between the spokes of the wheel and adapted to be engaged by said spokes to rotate the U-shaped member, and hence the conveyor, with the wheel. A suitable washer 15 is provided between the end of the axle and the nut 16 to prevent the escape of lubricant.

When it is desired to fill the interior of the axle with the lubricant it is merely necessary to remove the plug 32 and to insert the screw threaded projection 23' on the end of a grease gun 24. The grease gun 24 is adapted by motion of a plunger 25 operated by the rotation of the handle 29 around the longitudinal axes of the handle 30 and the screw threaded piston rod 28 in its screw threaded bearing 26 to force the lubricant into the interior of the axle.

From the foregoing description it will be seen that my device operates as follows:

To fill the container with lubricant it is merely necessary to remove the plug 32 and fill the container by operation of the grease gun 24. The plug 32 is then inserted, the conveyor shaft 12 having its squared end seated in the square cut recess 20. As the wheel starts to rotate the spokes thereof will engage the longer arm of the U-shaped member 18 and will thus rotate the conveyor shaft 12. Rotation of the conveyor shaft 12 will, by reason of the left and right hand conveyors force the lubricant toward the center of the grease containing axle and outwardly through the aperture 31 into the recess 34. The fins 6 will then pick up the grease in the recess 34 to force the same into the longitudinal bores 8 and outwardly through the apertures 7 on to the rotating axle. The spirally cut groove in the axle will then receive the lubricant and equally distribute the same throughout the surface of the bearing and the shaft.

It will thus be seen that I have provided a self-feeding lubricating system which is adapted to amply lubricate a bearing of this type for a time ample to provide for the take-off of an aircraft of any type and to insure proper lubrication for extended towing of the craft. Furthermore, my device can be simply and easily charged with lubricant without the removal of the wheels of the aircraft and with a minimum of time and effort.

I claim:

1. In combination, in a lubricating device for lubricating the bearings of a wheel mounted on a stationary axle, a lubricant reservoir formed within said axle, a pair of bearings adapted to be inserted in the opposite ends of the bearing housing of said wheel and providing a space intermediate of the inner ends thereof, a plurality of longitudinally extending bores through said bearings opening towards said space, angularly disposed fins extending into said space disposed adjacent said bores, apertures formed in said bearings and connecting said bores with the wearing surface of said bearing and means operated by the rotation of said wheel to forcibly feed lubricant from said reservoir to said space.

2. In combination, in a lubricating device for lubricating the bearings of a wheel mounted on a stationary axle, a lubricant reservoir formed within said axle, a pair of bearings adapted to be inserted in the opposite ends of the bearing housing of said wheel and providing a space intermediate of the inner ends thereof, a plurality of longitudinally extending bores through said bearings opening towards said space, angularly disposed fins extending into said space disposed adjacent said bores, apertures formed in said bearings and connecting said bores with the wearing surface of said bearing and means operated by the rotation of said wheel to forcibly feed lubricant from said reservoir to said space, and a spiral groove on the inner surface of said bearing.

In testimony whereof I affix my signature.

CHARLES W. DWORACK.